(12) United States Patent
Ghetti

(10) Patent No.: US 8,282,792 B2
(45) Date of Patent: *Oct. 9, 2012

(54) PROCESS AND SYSTEM FOR THE PURIFICATION OF TRICHLOROSILANE AND SILICON TETRACHLORIDE

(75) Inventor: Gianfranco Ghetti, Rho (IT)

(73) Assignee: MEMC Electronic Materials S.p.A., Novara (IT)

( * ) Notice: Subject to any disclaimer, the term of this patent is extended or adjusted under 35 U.S.C. 154(b) by 0 days.

This patent is subject to a terminal disclaimer.

(21) Appl. No.: 13/014,532

(22) Filed: Jan. 26, 2011

(65) Prior Publication Data

US 2011/0114469 A1   May 19, 2011

Related U.S. Application Data

(63) Continuation of application No. 11/719,688, filed as application No. PCT/IT2005/000662 on Nov. 14, 2005, now Pat. No. 7,879,198.

(30) Foreign Application Priority Data

Nov. 19, 2004   (IT) .............................. RM2004A0570

(51) Int. Cl.
  *B01D 3/14*   (2006.01)
  *B01D 3/34*   (2006.01)
  *C01B 33/107*  (2006.01)

(52) U.S. Cl. ................ 203/29; 203/38; 203/62; 203/67; 203/74; 203/75; 203/77; 203/78; 203/80; 423/342; 423/347

(58) Field of Classification Search ................ 203/29, 203/38, 62, 67, 74, 75, 77, 78, 80; 423/276, 423/299, 342, 347
See application file for complete search history.

(56) References Cited

U.S. PATENT DOCUMENTS

| 3,069,239 A | 12/1962 | Winter |
| 3,252,752 A | 5/1966 | Pohl |
| 4,340,574 A | 7/1982 | Coleman |
| 4,409,195 A | 10/1983 | Darnell |
| 4,481,178 A | 11/1984 | Kray |
| 2010/0278706 A1* | 11/2010 | Mueh et al. ................... 423/342 |
| 2011/0052474 A1* | 3/2011 | Mueh et al. ................... 423/342 |

FOREIGN PATENT DOCUMENTS

| GB | 975000 A | 11/1964 |
| GB | 1241108 A | 7/1971 |

OTHER PUBLICATIONS

International Search Report for PCT/IT2005/000662 dated May 18, 2006, 2 pgs.
Office Action dated Jun. 11, 2010 for U.S. Appl. No. 11/719,688, 8 pgs.

* cited by examiner

*Primary Examiner* — Virginia Manoharan
(74) *Attorney, Agent, or Firm* — Armstrong Teasdale LLP

(57) ABSTRACT

The present disclosure relates to processes and systems for purifying technical grade trichlorosilane and/or technical grade silicon tetrachloride into electronic grade trichlorosilane and/or electronic grade silicon tetrachloride.

22 Claims, 1 Drawing Sheet

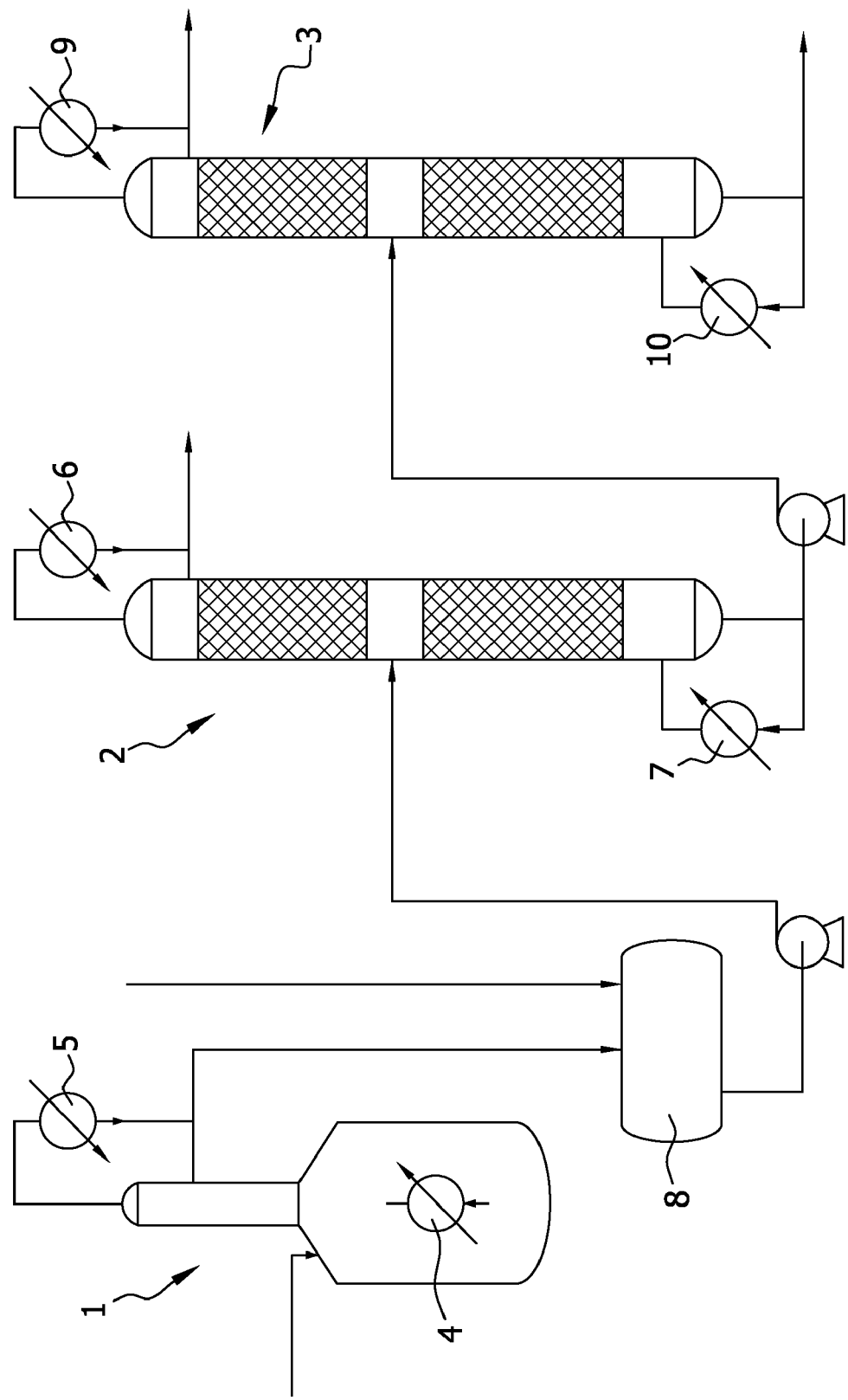

PROCESS AND SYSTEM FOR THE PURIFICATION OF TRICHLOROSILANE AND SILICON TETRACHLORIDE

CROSS-REFERENCE TO RELATED APPLICATIONS

This application is a continuation of U.S. patent application Ser. No. 11/719,688, filed Aug. 21, 2007, now U.S. Pat. No. 7,879,198, which is the national stage of International Application No. PCT/IT2005/000662, filed Nov. 14, 2005 which claims priority to Italian Patent Application No. IT RM2004A000570, filed Nov. 19, 2004, each of which is incorporated by reference herein in its entirety.

DETAILED DESCRIPTION OF THE DISCLOSURE

The present invention concerns a process and plant for the purification of trichlorosilane and silicon tetrachloride.

More in particular the invention refers to the purification of technical grade trichlorosilane and silicon tetrachloride in order to obtain electronic grade trichlorosilane and silicon tetrachloride.

It is known that the raw material for the production of silicon polycrystals for electronic use is constituted by technical grade trichlorosilane (also identified by means of the acronym TCS TG, wherein TCS stands for trichlorosilane and TG stands for technical grade) and/or silicon tetrachloride (identified, with the same above methodology, by means of the acronym TET TG). These products contain different impurities, principally consisting of other silanes, such as silicon tetrachloride and dichlorosilane, but also of metallic chlorides, boron trichloride ($BCl_3$) and other boron compounds (the boron acting in silicon as a doping agent of positive electrical charges) and arsenic and phosphorus trichlorides ($AsCl_3$ and $PCl_3$) (which act in silicon as doping agents of negative charges). The presence of the said impurities prevents technical grade trichlorosilane and silicon tetrachloride from being used in processes for the production of semiconductors, wherein the electrical resistivity control is managed by a rigorous control of doping impurities.

Moreover, the hydrochloric acid used in the synthesis of chlorosilanes, being a recycle product from the production of organosilanes, is generally contaminated by carbon impurities.

The presence of metallic impurities, boron, arsenic and phosphorus chlorides and of carbon-chlorine compounds, does not allow the direct use of TCS TG or TET TG neither for the production of silicon polycrystals for electronic use and for the growing of epitaxial layers in convenient reactors named Epi, nor for the production of electronic semiconductor devices.

In order to use TCS TG and TET TG in these processes, i.e. can be classified as having an electronic purity grade, they must be further purified, in order to reduce the concentration of impurities by a factor of at least 10000 or 100000 times.

The purification of TCS TG or TET TG is generally obtained by means of hyper distillation, based on the difference between the impurities boiling temperature and the TCS and TET boiling temperatures. The following Table 1 shows the boiling temperature of the different compounds.

TABLE 1

| Low boiling Compound | T (° C.) | High boiling Compound | T (° C.) |
|---|---|---|---|
| Trichlorosilane (TCS) | 33.0 | Silicon tetrachloride (TET) | 57.6 |
| Boron trichloride $BCl_3$ | 12.5 | Phosphorus trichloride ($PCl_3$) | 75.5 |
| Dichlorosilane (DCS) | 8.3 | Arsenic trichloride ($AsCl_3$) | 130.2 |

Nevertheless, simple distillation requires using columns having a high number of plates and very high reflux ratios, implying very high columns and high strake diameters, requiring high investment costs. For such boron compounds having a boiling point very close to that of TCS, distillation even is unable to remove the impurity in an efficient way.

An alternative purification process is constituted by the purification process by means of wet nitrogen bubbles. In this process, the reaction of TCS and/or TET with moisture carried by nitrogen leads to the formation of $SiO_2$ and high boiling point poly-siloxanes (Si—OH bonds), acting also as complexing agents. The purity grade that is obtainable by means of the purification process with "wet $N_2$" does not exceed a P-type value of 100 ohm cm. In fact, the complexing effect of the $H_2O$ molecules and of the polysiloxanes is in any case lower then the complexing capacity proper of electron rich big molecules.

This kind of capacity, proper of some compounds, is exploited in the purification processes by means of complexation of the impurities with tin or titanium chlorides or with electron rich big molecules, wherein a first step of complexation is followed by distillation. This class of processes, in spite of the fact that they are improvement with respect to the direct distillation and to the complexation with $H_2O$, does not grant an optimal level purity of electronic grade TCS and TET, in terms of p-type resistivity (this feature being very important in cases where the obtained purified TCS is subsequently used for the growth of the layers in epitaxial reactors).

Amongst the purification processes by means of complexation of the impurities, a process is known (developed by Pechiney, patent GB975000) making use of tin and titanium chlorides ($SnCl_4$ and $TiCl_4$), bromine ($Br_2$) and chlorine ($Cl_2$), in order to oxidize phosphorus to $P^{5+}$ and to complex it at ambient temperature in a 2-24 hours batch cycle. The subsequent removal of the introduced metals and other impurities (such as boron, aluminum, antimony, vanadium) is obtained by a precipitation step, by adding triphenylchloromethane or triphenylmethylchloride (TCM). Electronic grade TCS is then obtained by means of a subsequent distillation.

The purity level that can be obtained by means of the above said process can be successfully used in cases where a TCS EG having a p-type value of 1000 ohm·cm is considered sufficient. In fact, this kind of process was developed in a period when this level of purity was able to meet the market requirements.

A further process for the purification of chlorosilanes, in particular TCS, belonging to the same category, was developed by Dynamit Nobel (patent GB1241108) and makes use of a process for the complexation of boron and metallic impurities by means of one or more heterocyclic mononuclear or polynuclear solid compounds, containing nitrogen (N) as part of a heterocyclic ring and sulfur (S) as part of another heterocyclic ring, and being able to block the impurities in the form of solid complexes and subsequently allowing the distillation of pure TCS.

As a common feature, these additives (about ten are listed in the patent) have a very high electron number and consequently have a great aptitude to the formation of covalent bonds, N (nitrogen) bonds, S (sulfur) bonds, OH groups (examples: 6-methyl-2-thiouracil, N(phenyl)N—CH$_3$—SH, N-methyl-2-thioimidazoline, H—N(phenyl)N—CH$_3$—S, phenothiazine, HN-(phenyl-phenyl)S).

This process also was developed in the second half of the sixties, when a TCS EG purity level around p-type levels of about 1000 ohm·cm was considered sufficient in order to meet the market requirements.

The solution according to the present invention is to be considered in this context, with the aim of providing a process and a plant for the purification of technical grade trichlorosilane and silicon tetrachloride in order to obtain electronic grade trichlorosilane and silicon tetrachloride, by means of a reaction of complexation of the boron impurities (trichloride (BCl$_3$)) and other metallic impurities, optionally present, with diphenylthiocarbazone (Ditizone or also DTZ) and triphenylchloromethane (TCM), and subsequent removal of the complexation products and the remaining impurities.

These and other results are obtained according to the present invention by providing a process in three steps: 1) removal of boron trichloride BCl$_3$ other boron compounds and metallic impurities by means of complexation thereof; 2) removal of phosphorus chlorides PCl$_3$ and phosphorus containing compounds, arsenic chlorides AsCl$_3$ and arsenic containing compounds, aluminum compounds, antimony compounds and in general all the metals and metalloids compounds and carbon-silane compounds by means of distillation (the purity level obtained after the removal of these compounds is sufficient for the production of the electronic grade polycrystal); 3) removal of the possibly present dichlorosilane by means of further distillation (for the production of TCS EG suitable for feeding epitaxial reactors).

It is therefore a first specific object of the present invention a process for the purification of trichlorosilane and/or silicon tetrachloride comprising the following steps of treating technical grade trichlorosilane and/or technical grade silicon tetrachloride:

complexation of the boron impurities (trichloride (BCl$_3$)) and other metallic impurities by addition of diphenylthiocarbazone and/or triphenylchloromethane, with the formation of complex macromolecules having high boiling point, first column distillation of the complexation step products, wherein the complexed boron impurities, together with other metallic impurities are removed as bottoms, and second column distillation of the tops of the previous distillation, wherein electronic grade trichlorosilane (plus dichlorosilane possibly present) and/or silicon tetrachloride are obtained as tops and phosphorus chlorides (PCl$_3$) and phosphorus containing compounds, arsenic chlorides (AsCl$_3$) and arsenic containing compounds, aluminium compounds, antimony compounds and in general all the present metals and metalloids compounds and carbo-silane compounds, having a certain residual amount of trichlorosilane and/or silicon tetrachloride, are obtained as bottoms.

The purification process according to the invention can comprise a further distillation step of the bottoms of said second distillation, through which trichlorosilane and/or dichlorosilane free silicon tetrachloride are obtained as tops and phosphorus chlorides PCl$_3$ and phosphorus containing components, arsenic chlorides AsCl$_3$ and arsenic containing compounds, aluminum compounds, antimony compounds and in general all the metals and metalloids and carbon-silane compounds which are present are obtained as bottoms.

In particular, according to the invention, said complexation step takes place by adding an excess amount, with respect to the stoichiometric amount, of one or both diphenylthiocarbazone and/or triphenylchloromethane.

Preferably, according to the invention, said complexation step takes place by adding diphenylthiocarbazone in an amount that is twice the amount of triphenylchloromethane.

Further, in the process according to the invention, the bottom temperature in said first distillation step is comprised between 38 and 48° C. (preferably it is 42° C.) for the purification of trichlorosilane and between 65 and 75° C. (preferably 69° C.) for the purification of silicon tetrachloride.

In particular, according to the invention, said first distillation step is initially operated with a total reflux of the tops, in order to allow the boron and other metals impurities complete complexation, preferably for a time period of at least 3 hours, and, following that period of total reflux, the distillation is conducted with a top reflux flow comprised between 0.3 as a minimum and 2.8 as a maximum, preferably 1.33 as far as TCS is concerned and between 0.17 as a minimum and 5 as a maximum, preferably 2.5 as far as TET is concerned.

Said values represents the reflux ratio, i.e. the ratio between the flow of condensate tops returned to the top of the column and the flow of extracted tops (distillate).

It is further a second specific object of the present invention a plant for the purification of trichlorosilane and/or silicon tetrachloride comprising the following apparatuses for treating technical grade trichlorosilane and/or technical grade silicon tetrachloride:

a column for the complexation and distillation of boron (trichloride (BCl$_3$)) impurities and other metallic impurities, working in batch, by adding diphenylthiocarbazone and/or triphenylchloromethane, with the formation of high boiling complex macromolecules, wherein the complexed boron impurities, together with other complexed metallic impurities are removed as bottoms, and a column for the distillation of the tops of the previous complexation and distillation column, wherein electronic grade trichlorosilane (and possibly present dichlorosilane) and/or silicon tetrachloride are obtained as tops and phosphorus chlorides (PCl$_3$) and phosphorus containing compounds, arsenic chlorides (AsCl$_3$) and arsenic containing compounds, aluminium compounds, antimony compounds and in general all the metals and metalloid and carbon-silane compounds that are present, together with a certain residual amount of trichlorosilane and/or silicon tetrachloride, are obtained as bottoms, and, possibly, an intermediate vessel between said complexation and distillation column and said distillation column, wherein the tops of the complexation and distillation column are collected in order to constitute a feed reservoir for the distillation column, during the starting phase of the following operative cycle of the complexation and distillation column, and a further distillation column, for the bottoms of said distillation column, wherein trichlorosilane and/or dichlorosilane free silicon tetrachloride are obtained as tops and phosphorus chlorides (PCl$_3$), phosphorus containing compounds, arsenic chlorides (AsCl$_3$) and arsenic containing compounds, aluminium compounds, antimony compounds and in general all the metals and metalloid and carbon-silane compounds that are present, together with a certain residual amount of trichlorosilane and/or silicon tetrachloride, are obtained as bottoms.

In particular, according to the invention, in said purification plant, characterised in that the bottom temperature in said complexation and distillation column is comprised between 38 and 48° C. (preferably is 42° C.) for the purification of trichlorosilane and between 65 and 75° C. (preferably 69° C.) for the purification of silicon tetrachloride, while the thermal fluid temperature of the exchanger at the bottom of the column is comprised between 58 and 73° C. (preferably is 60° C.) for the purification of trichlorosilane and between 75 and 83° C. (preferably 79° C.).

The purification plant according to the present invention further comprises linking conduits between the different apparatuses, linking conduits to other plants, inlet conduits for the materials to treat and outlet conduits for the treated materials, pumps, adjustment and control instruments.

The effectiveness of the purification process and plant according to the present invention are self-evident. In fact, the use of the two complexing agents TCM and DTZ and the rigorous control of the complexation temperature, have a much higher boron and metallic impurities reducing power than the previously known processes and is able to guarantee a remarkable stability and qualitative repeatability over time.

In particular, even if TCM and DTZ allow to realise the complexation of TCS and TET impurities also if singularly used (TCM allows the complexation of many metals except boron), the use of these complexing agents together is needed in order to complex all the impurities.

In conclusion, the combined effect of TCM and DTZ shows optimal complexation efficiency, creating a synergy with respect to the separate and/or sequential use of said two complexing agents.

The invention will be described herein below for illustrative, but non limitative, purpose with reference in particular to FIG. 1, in which it is shown a schematic flow diagram related to the purification of trichlorosilane and/or silicon tetrachloride according to a preferred embodiment of the present invention.

In particular, a complexation and distillation column 1, a distillation column 2 and a further distillation column 3 of the dichlorosilane free trichlorosilane are shown.

The complexation and distillation column 1 is the device wherein boron impurities (trichloride ($BCl_3$)) and other metallic impurities are removed from trichlorosilane TCS TG and/or from silicon tetrachloride TET TG by means of a batch process constituted by a complexation reaction of said impurities with diphenylthiocarbazone (Ditizone or DTZ) and triphenylchloromethane (TCM).

The complexing additives promote the formation of covalent bonds between the impurities and additives themselves, causing the formation of high boiling complex macromolecules. In particular, the reaction takes place between the big molecules of Ditizone and TCM, rich in available electrons, and the molecules of $BCl_3$ and other boron compounds and possibly other metallic chloride molecules poor in electrons, forming strong complexes having a very high boiling point.

It is a critical feature of this process, in order to obtain an effective removal of the impurities, to control the temperature at which the complexation reaction takes place. In fact, it is required a very rigorous control of the temperature range at which the complexation reaction takes place, otherwise the obtained complexes can decompose. It will be necessary to control that the temperature at the bottom of the column is always comprised between 38 and 48° C. (preferably is equal to 42° C.) for the purification of trichlorosilane to take place and between 65 and 75° C. (preferably 69° C.) for the purification of silicon tetrachloride.

The bottom of the complexation and distillation column 1 is heated by means of a heat exchanger 4, inside which a thermal fluid flows, whose temperature is comprised between 58 and 73° C. (preferably is equal to 60° C.), in the case of trichlorosilane purification and between 75 and 83° C. (preferably 79° C.) for the purification of silicon tetrachloride.

Heating the bottom of column 1 causes the evaporation of the lowest boiling compounds comprised in the blend to treat. These compounds begin to ascend along column 1, passing through the different stages in which the column is divided up to the top stage. Here, a condenser 5 causes the vapours condensation and their reflux to the column. In stationary conditions, an equilibrium is set between the vapour flow ascending inside column 1 and the liquid flow descending inside the same column 1 and complexed boron impurities separation is obtained, this impurities being removed as bottoms of column 1 together with other complexed metallic impurities. In order to reach the equilibrium conditions, column 1 is initially operated with a 100% reflux at the top. After the equilibrium condition is reached, column 1 is operated according to design specifications until complete depletion of the batch.

The tops of column 1 are used to feed an intermediate section of the distillation column 2, in which electronic grade trichlorosilane (and dichlorosilane possibly present) and/or silicon tetrachloride are obtained as tops and phosphorus chlorides ($PCl_3$) and phosphorus containing compounds, arsenic chlorides ($AsCl_3$) and arsenic containing compounds, aluminium compounds, antimony compounds and in general all the present metals and metalloid and carbon-silane compounds, together with a certain residual amount of trichlorosilane and/or silicon tetrachloride, are obtained as bottoms.

The distillation column 2 is a common packed column, with a condenser 6 at the top and a reboiler 7 at the bottom.

Between the complexation and distillation column 1 and the distillation column 2 an intermediate vessel 8 is shown, in which the tops of column 1 are accumulated in order to constitute a reserve for the feed of the distillation column 2, during the starting phase of the subsequent operative cycle of the complexation and distillation column 1. Further, inside the intermediate vessel 8 the tops of column 1 can be mixed together with a flow of trichlorosilane, dichlorosilane and various impurities (not comprising boron and/or other metallic impurities), coming from the reactors of a polycrystalline silicon production plant.

The bottoms of distillation column 2 are used to feed the intermediate section of a further distillation column 3, which is present in case the electronic grade trichlorosilane has to be used for the deposition of epitaxial layers. In fact, TCS EG suitable to produce silicon polycrystal contains a certain percentage of dichlorosilane (DCS) that must be removed if the TCS EG is used for the deposition of epitaxial layers.

The distillation column 3 is also a packed column, with a condenser 9 at the top and a reboiler 10 at the bottom, in which trichlorosilane and/or dichlorosilane free silicon tetrachloride are obtained as tops and phosphorus chlorides ($PCl_3$) and phosphorus containing compounds, arsenic chlorides ($AsCl_3$) and arsenic containing compounds, aluminium compounds, antimony compounds and in general all the present metals and metalloids and carbon-silane compounds are obtained as bottoms.

EXAMPLE

In the following the features of the various process parameters of a plant for the purification of trichlorosilane and/or silicon tetrachloride realised according to the present invention are listed.

Table 2 shows the features of TCS TG fed to the complexation and distillation column 1.

TABLE 2

| Parameter | Range | Notes |
|---|---|---|
| TCS (% by weight) | >99.7 | |
| DCS (% by weight) | <0.1 | |
| TET (% by weight) | <0.2 | |
| C—H, Transmittance (Cell path = 10 mm) | 3.37-3.42 > 75% | |
| Methylsilanes (total), | <6 ppm By weight | |
| Boron | <300 ppb By weight | |
| Phosphorus | <5 ppb By weight | |
| Arsenic | <5 ppb By weight | |

Table 3 shows the features of TET TG fed to the complexation and distillation column 1.

TABLE 3

| Parameter | Range | Notes |
|---|---|---|
| TCS (mg/kg) | ≦500 | |
| SiOH (RC) | ≦0.30 | |
| —CH (RC) | ≦0.30 | |
| Fe, Co, Ni (mg/kg) | ≦0.10 | |
| Cr, Mn, Cu (mg/kg) | ≦0.10 | |
| Titanium (mg/kg) | ≦0.01 | |
| Metals total (mg/kg) | ≦0.30 | |
| Aluminium (mg/kg) | ≦0.10 | |
| Boron (mg/kg) | ≦0.50 | |
| Sodium (mg/kg) | ≦0.50 | |
| Calcium (mg/kg) | ≦0.20 | |
| Methyltrichlorosilane (mg/kg) | ≦0.50 | |

In the following the standard and preferred values are reported for a series of operative parameters (with reference to the case of trichlorosilane (TCS) and silicon tetrachloride (TET) purification):

Complexation and distillation column 1 level: above 2500 kg (preferably 6900 kg) for TCS; above 3500 kg (preferably 11500 kg) for TET.

Complexing agent amount: preferably 50 g of TCM and 25 g of DTZ for TCS; 100 g of TCM and 50 g of DTZ for TET.

Column 1 total top reflux functioning phase time: above 3 hours (preferably 3 hours) both for TCS and TET.

Top reflux flow at Total Reflux conditions (during the starting and complexation phase): between 3100 and 3800 kg/h (preferably 3500 kg/h) for TCS; between 3500 and 6000 kg/h (preferably 5000 kg/h) for TET.

Top extraction flow (distillate after complexation time): between 1000 and 2400 kg/h (preferably 1500 kg/h) for TCS; between 1000 and 3000 kg/h (preferably 2000 kg/h) for TET.

Column bottom temperature: between 38 and 48° C. (preferably 42° C.) for TCS; between 65 and 75° C. (preferably 69° C.) for TET.

Column bottom reboiler thermal fluid temperature: between 58 and 73° C. (preferably 60° C.) for TCS; between 75 and 83° C. (preferably 79° C.) for TET.

The present invention was described for illustrative, but not limitative purposes, according to its preferred embodiments, but it is to be understood that changes and/or modifications can be made by those skilled in the art without departing from the related scope of protection, as defined by the enclosed claims.

What is claimed is:

1. A process for purifying technical grade trichlorosilane and/or technical grade silicon tetrachloride into electronic grade trichlorosilane and/or electronic grade silicon tetrachloride, the process comprising:
adding diphenylthiocarbazone and triphenylchloromethane to the technical grade trichlorosilane and/or technical grade silicon tetrachloride to form complex impurity macromolecules with impurities in the technical grade trichlorosilane and/or technical grade silicon tetrachloride, the impurities being selected from the group consisting of boron impurities, metallic impurities, and combinations thereof;
distilling the technical grade trichlorosilane and/or technical grade silicon tetrachloride having complex impurity macromolecules in a first column distillation, wherein the first column distillation results in first distillation tops and first distillation bottoms, wherein the first distillation bottoms comprise complex impurity macromolecules separated from the first distillation tops; and
distilling the first distillation tops in a second column distillation resulting in second distillation tops and second distillation bottoms, wherein the second distillation bottoms comprise a residual amount of trichlorosilane and/or silicon tetrachloride and a compound selected from the group consisting of phosphorus containing compounds, arsenic containing compounds, aluminum compounds, antimony compounds, metalloid compounds, carbosilane compounds, and combinations thereof, and the second distillation tops comprise electronic grade trichlorosilane and/or electronic grade silicon tetrachloride.

2. The process as set forth in claim 1, the process further comprising distilling the second distillation bottoms into third distillation tops and third distillation bottoms in a third column distillation, the third distillation bottoms comprising a compound selected from the group consisting of phosphorus containing compounds, arsenic containing compounds, aluminum compounds, antimony compounds, metalloid compounds, carbosilane compounds, and combinations thereof, and the third distillation tops comprising silicon tetrachloride and/or trichlorosilane free of dichlorosilane.

3. The process as set forth in claim 2 wherein the phosphorous containing compounds include phosphorous chloride and the arsenic containing compounds include arsenic chloride.

4. The process as set forth in claim 1 wherein adding diphenylthiocarbazone and triphenylchloromethane to the technical grade trichlorosilane and/or technical grade silicon tetrachloride comprises adding the diphenylthiocarbazone and triphenylchloromethane in an excess stoichiometric amount.

5. The process as set forth in claim 1 wherein the first distillation bottoms are at a temperature between 38° C. and 48° C. for the purification of technical grade trichlorosilane and between 65° C. and 75° C. for the purification of technical grade silicon tetrachloride.

6. The process as set forth in claim 5 wherein the first distillation bottoms are at a temperature of 42° C. for the purification of trichlorosilane and 69° C. for the purification of silicon tetrachloride.

7. The process as set forth in claim 1 wherein the first column distillation initially operated with a total reflux of the first distillation such that the impurities completely form complex impurity macromolecules.

8. The process as set forth in claim 7 wherein the initial total reflux of the first distillation tops is carried out for at least 3 hours.

9. The process as set forth in claim 1 wherein the boron impurities include boron trichloride, the phosphorous containing compounds include phosphorous chloride and the arsenic containing compounds include arsenic chloride.

10. A process for purifying technical grade trichlorosilane and/or technical grade silicon tetrachloride into electronic grade trichlorosilane and/or electronic grade silicon tetrachloride, the process comprising:
adding diphenylthiocarbazone and/or triphenylchloromethane to the technical grade trichlorosilane and/or technical grade silicon tetrachloride to form complex impurity macromolecules with impurities in the technical grade trichlorosilane and/or technical grade silicon tetrachloride, the impurities being selected from the group consisting of boron impurities, metallic impurities, and combinations thereof;
distilling the technical grade trichlorosilane and/or technical grade silicon tetrachloride having complex impurity macromolecules in a first column distillation, wherein the first column distillation results in first distillation tops and first distillation bottoms, wherein the first distillation bottoms comprise complex impurity macromolecules separated from the first distillation tops;
distilling the first distillation tops in a second column distillation resulting in second distillation tops and second distillation bottoms, wherein the second distillation bottoms comprise a residual amount of trichlorosilane and/or silicon tetrachloride and a compound selected from the group consisting of phosphorus containing compounds, arsenic containing compounds, aluminum compounds, antimony compounds, metalloid compounds, carbosilane compounds, and combinations thereof, and the second distillation tops comprise electronic grade trichlorosilane and/or electronic grade silicon tetrachloride; and
distilling the second distillation bottoms into third distillation tops and third distillation bottoms in a third column distillation, the third distillation bottoms comprising a compound selected from the group consisting of phosphorus containing compounds, arsenic containing compounds, aluminum compounds, antimony compounds, metalloid compounds, carbosilane compounds, and combinations thereof, and the third distillation tops comprising silicon tetrachloride and/or trichlorosilane free of dichlorosilane.

11. The process as set forth in claim 10 wherein adding diphenylthiocarbazone and/or triphenylchloromethane to the technical grade trichlorosilane and/or technical grade silicon tetrachloride comprises adding the diphenylthiocarbazone and/or triphenylchloromethane in an excess stoichiometric amount.

12. The process as set forth in claim 10 wherein the first distillation bottoms are at a temperature between 38° C. and 48° C. for the purification of technical grade trichlorosilane and between 65° C. and 75° C. for the purification of technical grade silicon tetrachloride.

13. The process as set forth in claim 12 wherein the first distillation bottoms are at a temperature of 42° C. for the purification of trichlorosilane and 69° C. for the purification of silicon tetrachloride.

14. The process as set forth in claim 10 wherein the first column distillation initially operated with a total reflux of the first distillation such that the impurities completely form complex impurity macromolecules.

15. The process as set forth in claim 14 wherein the initial total reflux of the first distillation tops is carried out for at least 3 hours.

16. The process as set forth in claim 10 wherein the boron impurities include boron trichloride, the phosphorous containing compounds include phosphorous chloride and the arsenic containing compounds include arsenic chloride.

17. The process as set forth in claim 10 wherein the phosphorous containing compounds include phosphorous chloride and the arsenic containing compounds include arsenic chloride.

18. A process for purifying technical grade trichlorosilane and/or technical grade silicon tetrachloride into electronic grade trichlorosilane and/or electronic grade silicon tetrachloride, the process comprising:
adding diphenylthiocarbazone and/or triphenylchloromethane to the technical grade trichlorosilane and/or technical grade silicon tetrachloride to form complex impurity macromolecules with impurities in the technical grade trichlorosilane and/or technical grade silicon tetrachloride, the impurities being selected from the group consisting of boron impurities, metallic impurities, and combinations thereof;
distilling the technical grade trichlorosilane and/or technical grade silicon tetrachloride having complex impurity macromolecules in a first column distillation, wherein the first column distillation results in first distillation tops and first distillation bottoms, wherein the first distillation bottoms comprise complex impurity macromolecules separated from the first distillation tops, the first column distillation initially operating with a total reflux of the first distillation such that the impurities completely form complex impurity macromolecules, the initial total reflux of the first distillation tops being carried out for at least 3 hours; and
distilling the first distillation tops in a second column distillation resulting in second distillation tops and second distillation bottoms, wherein the second distillation bottoms comprise a residual amount of trichlorosilane and/or silicon tetrachloride and a compound selected from the group consisting of phosphorus containing compounds, arsenic containing compounds, aluminum compounds, antimony compounds, metalloid compounds, carbosilane compounds, and combinations thereof, and the second distillation tops comprise electronic grade trichlorosilane and/or electronic grade silicon tetrachloride.

19. The process as set forth in claim 18 wherein adding diphenylthiocarbazone and/or triphenylchloromethane to the technical grade trichlorosilane and/or technical grade silicon tetrachloride comprises adding the diphenylthiocarbazone and/or triphenylchloromethane in an excess stoichiometric amount.

20. The process as set forth in claim 18 wherein the first distillation bottoms are at a temperature between 38° C. and 48° C. for the purification of technical grade trichlorosilane and between 65° C. and 75° C. for the purification of technical grade silicon tetrachloride.

21. The process as set forth in claim 20 wherein the first distillation bottoms are at a temperature of 42° C. for the purification of trichlorosilane and 69° C. for the purification of silicon tetrachloride.

22. The process as set forth in claim 18 wherein the boron impurities include boron trichloride, the phosphorous containing compounds include phosphorous chloride and the arsenic containing compounds include arsenic chloride.

* * * * *